(12) United States Patent
Leclercq

(10) Patent No.: US 8,935,520 B2
(45) Date of Patent: Jan. 13, 2015

(54) CONTROL WORD OBFUSCATION IN SECURE TV RECEIVER

(75) Inventor: Maxime Leclercq, Encinitas, CA (US)

(73) Assignee: MaxLinear, Inc., Carlsbad, CA (US)

( * ) Notice: Subject to any disclaimer, the term of this patent is extended or adjusted under 35 U.S.C. 154(b) by 724 days.

(21) Appl. No.: 13/076,172

(22) Filed: Mar. 30, 2011

(65) Prior Publication Data

US 2012/0079261 A1 Mar. 29, 2012

Related U.S. Application Data

(60) Provisional application No. 61/372,390, filed on Aug. 10, 2010, provisional application No. 61/319,198, filed on Mar. 30, 2010.

(51) Int. Cl.

| | | |
|---|---|---|
| G06F 12/14 | (2006.01) | |
| G06F 15/177 | (2006.01) | |
| H04N 21/418 | (2011.01) | |
| H04N 7/167 | (2011.01) | |
| H04N 21/4367 | (2011.01) | |

(52) U.S. Cl.
CPC ......... *H04N 7/1675* (2013.01); *H04N 21/4181* (2013.01); *H04N 21/4367* (2013.01)
USPC ................. 713/2; 713/1; 713/168; 713/194

(58) Field of Classification Search
None
See application file for complete search history.

(56) References Cited

U.S. PATENT DOCUMENTS

| | | | |
|---|---|---|---|
| 6,424,717 | B1 | 7/2002 | Pinder et al. |
| 6,882,729 | B2 | 4/2005 | Arling et al. |
| 7,409,570 | B2 | 8/2008 | Suzuoki |
| 7,506,358 | B1 | 3/2009 | Fry et al. |
| 8,180,735 | B2 | 5/2012 | Ansari et al. |
| 2003/0079138 | A1 | 4/2003 | Nguyen et al. |
| 2003/0163713 | A1 | 8/2003 | Cocchi et al. |
| 2004/0025010 | A1 | 2/2004 | Azema et al. |
| 2004/0039911 | A1 | 2/2004 | Oka et al. |
| 2004/0044906 | A1 | 3/2004 | England et al. |
| 2004/0181303 | A1 | 9/2004 | Walmsley |
| 2004/0210796 | A1 | 10/2004 | Largman et al. |
| 2005/0005138 | A1 | 1/2005 | Awai |

(Continued)

OTHER PUBLICATIONS

International Preliminary Report on Patentability for PCT Application No. PCT/US2011/030033, mailed on Oct. 11, 2012, 8 pages.

(Continued)

*Primary Examiner* — Dennis M Butler
(74) *Attorney, Agent, or Firm* — Kilpatrick Townsend & Stockton LLP

(57) ABSTRACT

A device for descrambling encrypted data includes a descrambler, a secure link, and a secure element that securely transmits a control word to the descrambler in a normal operating mode. The secure element includes a first secure register, a read-only memory having a boot code, a random-access memory for storing a firmware image from an external memory, and a processor coupled to the first secure register, the read-only memory, and the random access memory. The processor executes the boot code to generate the control word, stores the control word in the first secure register, and send the stored control word to the descrambler through a secure communication link. The descrambler may include a second secure register that is connected to the first secure register through the secure link. The first and second secure registers are not scannable during a normal operation. The secure link contains buried signal traces.

15 Claims, 7 Drawing Sheets

(56) References Cited

U.S. PATENT DOCUMENTS

| | | | |
|---|---|---|---|
| 2005/0138397 A1 | 6/2005 | Kusudo et al. | |
| 2005/0268086 A1 | 12/2005 | Kim | |
| 2006/0015731 A1 | 1/2006 | Lakshmi Narayanan | |
| 2006/0117177 A1 | 6/2006 | Buer | |
| 2006/0236113 A1 | 10/2006 | Uzawa | |
| 2006/0259743 A1 | 11/2006 | Suzuoki | |
| 2006/0272022 A1 | 11/2006 | Loukianov et al. | |
| 2007/0074045 A1* | 3/2007 | Van Essen et al. | 713/189 |
| 2007/0150734 A1 | 6/2007 | Gervais et al. | |
| 2007/0180464 A1 | 8/2007 | Dellow et al. | |
| 2007/0192610 A1 | 8/2007 | Chun et al. | |
| 2007/0294494 A1 | 12/2007 | Conti et al. | |
| 2008/0005586 A1 | 1/2008 | Munguia | |
| 2008/0016349 A1 | 1/2008 | Kahn | |
| 2008/0101604 A1 | 5/2008 | Kocher et al. | |
| 2008/0183992 A1 | 7/2008 | Martin et al. | |
| 2008/0219494 A1 | 9/2008 | Chen | |
| 2008/0235406 A1 | 9/2008 | Meijer et al. | |
| 2008/0240230 A1 | 10/2008 | Oxman et al. | |
| 2008/0267410 A1 | 10/2008 | Dellow | |
| 2009/0044233 A1 | 2/2009 | Brandt et al. | |
| 2009/0049220 A1 | 2/2009 | Conti et al. | |
| 2009/0094597 A1 | 4/2009 | Moskalik et al. | |
| 2009/0109487 A1 | 4/2009 | Tsukada | |
| 2009/0144557 A1 | 6/2009 | Sutton | |
| 2010/0014671 A1* | 1/2010 | Moroney | 380/262 |
| 2010/0020963 A1 | 1/2010 | Candelore | |
| 2010/0293614 A1 | 11/2010 | Vilppola et al. | |
| 2011/0138192 A1 | 6/2011 | Kocher et al. | |
| 2012/0036372 A1 | 2/2012 | Leclercq | |
| 2012/0042157 A1 | 2/2012 | Leclercq | |
| 2012/0060039 A1 | 3/2012 | Leclercq | |
| 2012/0079279 A1 | 3/2012 | Leclercq | |
| 2012/0079287 A1 | 3/2012 | Leclercq | |
| 2012/0198224 A1 | 8/2012 | Leclercq | |

OTHER PUBLICATIONS

International Preliminary Report on Patentability for PCT Application No. PCT/US2011/030378, mailed on Oct. 11, 2012, 7 pages.
International Preliminary Report on Patentability for PCT Application No. PCT/US2011/030581, mailed on Oct. 11, 2012, 6 pages.
Non-Final Office Action for U.S. Appl. No. 13/072,069, mailed on Nov. 28, 2012, 22 pages.
Non-Final Office Action for U.S. Appl. No. 13/026,000, mailed on Dec. 26, 2012, 26 pages.
International Search Report and Written Opinion corresponding to the PCT Application No. PCT/US2011/023749, date of mailing Apr. 6, 2011, 18 pages.
International Search Report and Written Opinion corresponding to the PCT Application No. PCT/US2011/024543, date of mailing Apr. 6, 2011, 17 pages.
International Search Report and Written Opinion corresponding to the PCT Application No. PCT/US2011/030581, date of mailing May 25, 2011, 8 pages.
International Preliminary Report on Patentability for PCT Application No. PCT/US2011/027299, mailed on Sep. 20, 2012, 7 pages.
Non-Final Office Action for U.S. Appl. No. 13/021,178, mailed on Sep. 17, 2012, 28 pages.
Leach et al. "A Universally Unique Identifier (UUID) URN Namespace", downloaded from http://www.ietf.org/rfe/rfe4122.txt, on Sep. 8, 2012, 30 pages.
Brusilovsky et al. "Password-Authenticated Diffie-Hellman Exchange (PAK)", downloaded from http://tools.ietf.org/html/draft-brusilovsky-pak-09, on Sep. 8, 2012, 13 pages.
Non-Final Office Action for U.S. Appl. No. 13/041,256, mailed on Sep. 14, 2012, 33 pages.
International Preliminary Report on Patentability for PCT Application No. PCT/US2011/024543, mailed on Aug. 23, 2012, 8 pages.
International Preliminary Report on Patentability for PCT Application No. PCT/US2011/023749, mailed on Aug. 16, 2012, 9 pages.
International Search Report and Written Opinion corresponding to the PCT Application No. PCT/US2011/030378, date of mailing May 31, 2011, 13 pages.
International Search Report and Written Opinion corresponding to the PCT Application No. PCT/US2011/030033, dated of mailing Nov. 8, 2011, 14 pages.
International Search Report and Written Opinion corresponding to the PCT Application No. PCT/US2011/027299, dated of mailing Oct. 27, 2011, 14 pages.
Final Office Action for U.S. Appl. No. 13/021,178, mailed on May 23, 2013, 20 pages.
Final Office Action for U.S. Appl. No. 13/041,256, mailed on May 24, 2013, 39 pages.
Final Office Action for U.S. Appl. No. 13/072,069, mailed on Jul. 23, 2013, 20 pages.
Non Final Office Action for U.S. Appl. No. 13/026,000, mailed on Jul. 30, 2013, 24 pages.
Non-Final Office Action for U.S. Appl. No. 13/075,038, mailed on Feb. 3, 2014, 23 pages.
Notice of Allowance for U.S. Appl. No. 13/205,578, mailed on Mar. 12, 2014, 17 pages.
Final Office Action for U.S. Appl. No. 13/026,000, mailed on Mar. 14, 2014, 22 pages.
Non Final Office Action for U.S. Appl. No. 13/041,256, mailed on May 7, 2014, 29 pages.
Notice of Allowance for U.S. Appl. No. 13/205,578, mailed on Jul. 18, 2014, 8 pages.
Final Office Action for U.S. Appl. No. 13/075,038, mailed on Sep. 18, 2014, 19 pages.

* cited by examiner

CONTROL WORD OBFUSCATION IN SECURE TV RECEIVER

CROSS-REFERENCES TO RELATED APPLICATIONS

The present application claims benefit under 35 USC 119 (e) of the following US applications, the contents of all of which are incorporated herein by reference in their entirety:

U.S. application No. 61/319,198, filed Mar. 30, 2010, entitled "Control Word Obfuscation in Secure TV Receiver"; and U.S. application No. 61/372,390, filed Aug. 10, 2010, entitled "Control Word Obfuscation in Secure TV Receiver".

The present application is related to and incorporates by reference the entire contents of the following US applications:

U.S. application Ser. No. 13/021,178, filed Feb. 4, 2011, entitled "Conditional Access Integration in a SOC for Mobile TV Applications";

U.S. application Ser. No. 13/026,000, filed Feb. 11, 2011, entitled "RAM Based Security Element for Embedded Applications";

U.S. application Ser. No. 13/041,256, filed Mar. 4, 2011, entitled "Code Download and Firewall for Embedded Secure Application";

U.S. application Ser. No. 13/072,069, filed Mar. 25, 2011, entitled "Firmware Authentication and Deciphering for Secure TV Receiver"; and U.S. application Ser. No. 13/075,038, filed Mar. 29, 2011, entitled "Generation of SW Encryption Key During Silicon Manufacturing Process";

BACKGROUND OF THE INVENTION

Embodiments of the present invention relate to the field of program code protection. More particularly, embodiments of the present invention relate to a system, circuit device and method for protecting control words in a secure module for a TV receiver.

Various contents such as movies, music, game software, sport events, and others are offered by service providers through a variety of wired and wireless communication networks. Some of these contents are encrypted so that they can be accessed or viewed by subscribers who are in possession of a corresponding decryption key. It is understandable that service providers will try to protect their software from tampering. Embodiments of the present invention relate to the pamper protection by obfuscating the decryption key and may apply to conditional access systems for digital broadcast television.

There are several well-known digital radio and digital TV broadcast standards. In Europe, the digital radio broadcast is the DAB (Digital Audio Broadcasting) adopted by the ITU-R standardization body and by ETSI. The digital TV standard is DVB (Digital Video Broadcasting) in Europe, ATSC (Advanced Television Systems Committee) in the U.S., and ISDB (Integrated Services Digital Broadcasting) in Japan and South America. In addition to these standards, there are also mobile TV standards which relate to the reception of TV on handheld devices such as mobile phones or the like. Some well-known mobile TV standards are DVB-H (Digital Video Broadcasting-Handheld), CMMB (China), DMB (Digital Multimedia Broadcasting), and Mediaflo.

In most digital TV broadcasting services, the service providers scramble and encrypt the transmitted data streams to protect the broadcasted content and require their customers or users to install "security protection" mechanisms to decrypt and descramble the content. Security protection mechanisms such as digital rights management enable users to store content. Conditional access (CA) systems are other security protection mechanisms that allow users to access and view content but may or may not record the viewed content.

In a typical pay-TV system, the conditional access software runs on a dedicated secure element implementing robust mechanisms so as to prevent a malicious entity ("hacker") from gaining access to the broadcast system secret to decipher the TV content. The CA instruction code and keys provisioned by the CA provider adapted to ensure security are typically stored in the discrete secure element. The communication link between the discrete secure element and the demodulator, if not protected, presents a vulnerable entry point for hackers to get access to the software or introduces malicious code to the TV system.

FIG. 1 is a block diagram of a conventional TV receiver 100 performing conditional access (CA) functions. Receiver 100 includes a TV demodulator 110 coupled to a suitable antenna 105 for receiving broadcast content. The broadcast content may be encrypted by a control word (CW). Demodulator 110 is connected to a dedicated secure element 120 via a communication link 150. Communication link 150 can be a proprietary interface or a standard interface. Secure element 120 may be provided by the service provider and controls access to a broadcast service by providing one or more control words to the demodulator via the communication link. Secure element 120 may include a CPU coupled to a memory unit which may contain EEPROM and/or ROM. Secure element 120 may also hold service entitlement information controlled by the service provider. The service provider may communicate with the secure element using encrypted messages that carry descrambling keys and other service management information.

Demodulator 110 receives the code word from the secure element and uses the code word to descramble the encrypted content. The clear stream is then provided to a video and audio decoder 130. A display 140 coupled to the video and audio decoder displays the decoded video and audio data streams. In general, secure element 120 may be provided in several forms and in multiple packaging options. For example, the secure element may be a dedicated surface mount device mounted on the receiver, a SIM card (e.g., in the context of a mobile phone), a secure SD card, or a module.

Because the communication link between the secure element and the demodulator is not secure, an additional layer, typically a software layer, is used to encrypt messages between the secure element and the demodulator. However, hackers or attackers may get access to this software layer through the communication link, and with it gain access to the code word. Therefore, the software layer must be made protected.

It can be seen that the conventional secure element has a hardware architecture that is not cost effective because it requires a dedicated module and a hardware connection to the demodulator. Furthermore, conventional techniques do not appear to address the concerns of service providers, CA operators, and content owners, namely, to provide security to the operation of their devices.

There is therefore a need to provide efficient methods and devices to securely protect information from access by unauthorized users or hackers using scanning, probing or any other techniques.

BRIEF SUMMARY OF THE INVENTION

Embodiments of the present invention provide an integrated circuit that integrates functions required to provide conditional access to a demodulator for deciphering encrypted information data, wherein the integrated circuit can be a monolithic silicon device formed on the same substrate using a conventional CMOS process, e.g., a CMOS system-on-a-chip (SOC). In an embodiment, the integrated circuit includes a demodulator and a secure element that is communicatively and electrically coupled to the demodulator. The secure element may include a non-volatile register containing a unique identifier, a read-only access memory (ROM) having a boot code, a random access memory (RAM), and a processing unit that is coupled to the read-only memory and the random access memory. The processor is operative to receive a firmware image, store the firmware image in the random access memory, authenticate the stored firmware image by executing the boot code and using the unique identifier. The term firmware denotes software, instruction codes, data files, configuration data and others that are stored in an external device, and the term firmware image denotes the firmware that has been download and stored in a secure memory disposed in the secure element. In other words, the firmware image denotes data representative of the firmware disposed in the external memory device. In a specific embodiment, the unique identifier is burned or blown during the integrated circuit manufacturing process. In an embodiment, the boot code may include computer readable and executable instruction codes that performs multiple security validations on the firmware image. In the event that the firmware image is successfully authenticated, the secure element generates a control word that is securely sent to the demodulator as an encryption key for deciphering the encrypted information data.

In an embodiment, the integrated circuit further includes a secure register that is protected or safeguarded from user access in a normal operation mode or in a test mode, the secure register is configured to store the control word before sending the control word to the demodulator for deciphering. In an embodiment, the secure register is coupled with the demodulator via a secure communication link having at least one buried signal trace.

In an embodiment, the integrated circuit also includes a test access port having a test logic circuit configured to set the integrated circuit in a test mode, where the content of the secure register is clear or reset while the integrated circuit is in the test mode to prevent the control word stored therein from being scanned out.

In an embodiment, a device for descrambling encrypted data may include a descrambler, a secure communication link, and a secure element that is configured to transmit a control word to the descrambler via the secure communication link. The secure element may include a secure or protected register, a read-only memory having a boot code, and a random access memory configured to store a firmware image. The secure element may also include a processor that is coupled to the protected register, the read-only access memory, and the random access memory, the processor being operative to execute the boot code using a portion of the firmware image to generate the control word and store the generated control word in the protected register. The processor further sends the stored control word to the descrambler through the secure communication link.

The device may also include a test access port having one or more input terminals configured to set the device in a test mode. The device may clear or reset the protected register upon entering the test mode to prevent the content of the protected register from being scanned out. In an embodiment, the secure communication link may include at least one buried signal trace.

Embodiments of the present invention also disclose a method of obfuscating a control word that is to be used by a receiver to descramble or decipher encrypted data streams. The receiver may include a demodulator and a secure element having a non-volatile register storing a unique identifier, a read-only memory having a boot code, and a random access memory. The method includes retrieving data from an external device, storing the retrieved data in the random access memory, generating a control word using the data stored in the random access memory by executing the boot code, and sending the generated control word to the demodulator.

In an embodiment, the method also includes storing the control word in a protected register prior to sending the control word to the demodulator. The method also provides a secure link that connects an output port of the protected register to an input port of the demodulator. In am embodiment, the secure link has at least one buried signal trace that is not accessible by probing.

In a specific embodiment of the present invention, the method may include setting the receiver in a test mode using a test access port. The method clears the content of the protected register before performing a test scan operation.

In an embodiment, the method further includes authenticating the data stored in the random access memory before generating the control word. In an embodiment, the authenticating includes comparing a value associated with a portion of the data with the unique identifier stored in the non-volatile register. In an embodiment, the generating a control word includes encrypting a value disposed in the data with the unique identifier.

Other embodiments, features and advantages of the present invention may be more apparent upon review of the specification and the claims to follow.

BRIEF DESCRIPTION OF THE DRAWINGS

Preferred embodiments of the present invention are described below, by way of example only, with reference to the accompanying drawings, in which.

DETAILED DESCRIPTION OF THE INVENTION

Conditional access is used by TV broadcasters to generate revenue. To achieve this, security guidelines are used to protect the keys provisioned to the user and to guarantee that no hacker or malicious entity can crack the system and watch contents for free. These guidelines, also referred to as security requirements, define methods adapted to prevent misuse of the SOC (system-on-chip) device and its associated firmware, and furthermore to inhibit unauthorized access to secrets, such as keys, operating modes, etc. The SOC security framework described herein defines hardware (HW), software (SW), or a combination thereof (i.e., firmware) to achieve these objectives.

Figure 1:
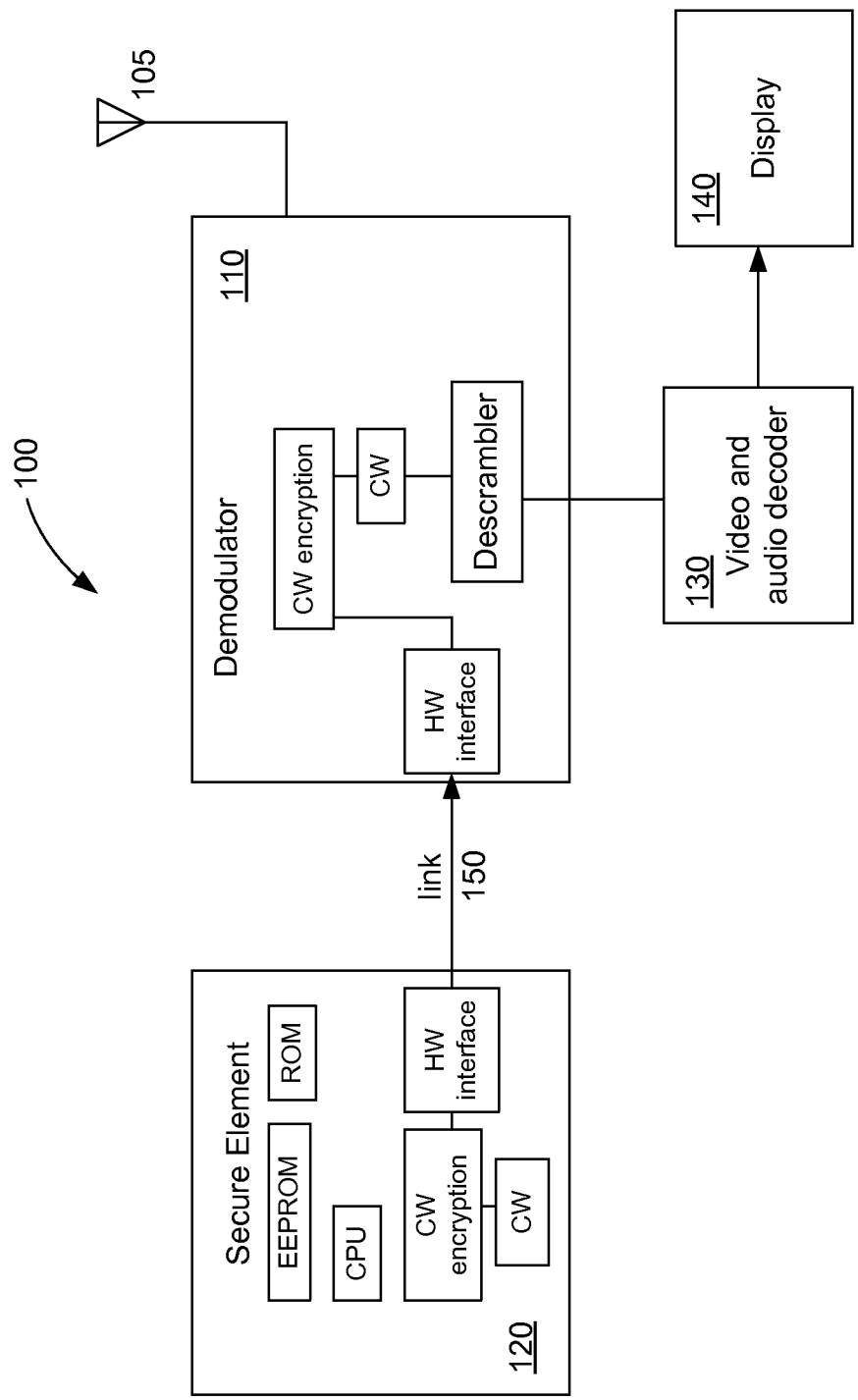
FIG. 1 is a block diagram of a conventional TV receiver 100 performing conditional access (CA) functions.
Figure 2:
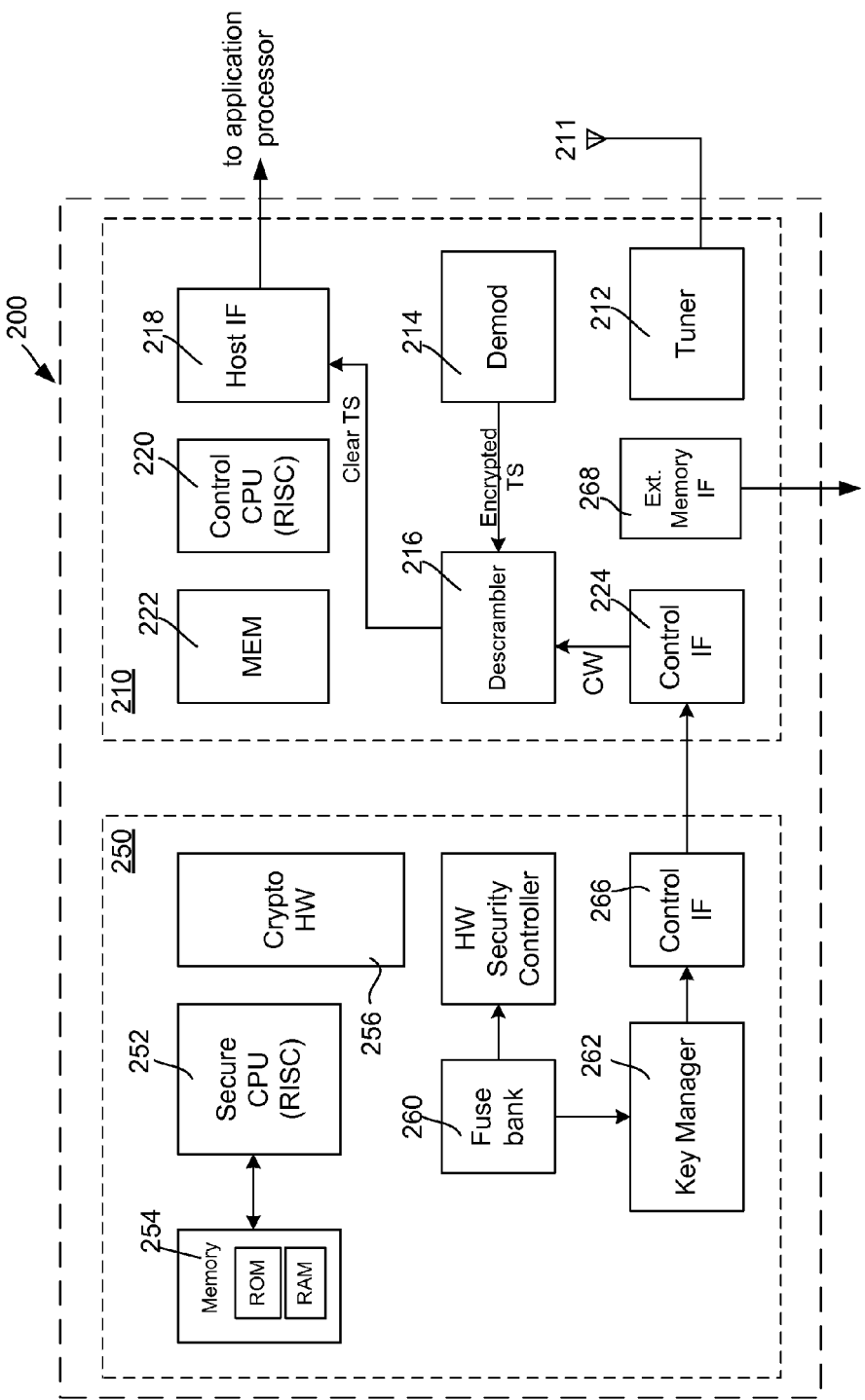
FIG. 2 is a simplified block diagram of a receiver system on a chip (SOC) according to an embodiment of the present invention.

FIG. 2 is a simplified block diagram of a receiver system on a chip (SOC) 200 configured to perform tuning, demodulating, CA security, and the like, in accordance with an embodiment of the present invention. Receiver system 200 includes a digital broadcast receiver 210 that may be capable of receiving signals in a number of different frequency bands of interest and/or in a number of different formats. By way of example, receiver system 200 may be capable of receiving any one or more of the standards mentioned above or other suitable standards. In an exemplary embodiment, receiver system 300 also includes a conditional access security (CAS) sub-system 250.

Digital broadcast receiver 210 includes a tuner 212 that is connected to an antenna 211. Although an antenna is shown, tuner 212 may be connected to a number of antennas that is configured to suit different frequency bands of interest. The tuner frequency translates received signals and provide them to a demodulator 214, which may demodulate the frequency translated signals into multiple data streams (audio, video, text, and others). Receiver 210 also includes a descrambler 216 that descrambles the data streams (indicated as encrypted TS) and provides clear (i.e., descrambled) data streams (indicated as clear TS in FIG. 2) to a host via a host interface unit 218. Receiver 210 further includes a control processor 220 and a memory unit 222 that contains software (program code) to enable a user to select a service and to program the tuner to a desired frequency. In an embodiment, memory 222 may include dynamic random memory and/or permanent memory such as read-only memory (ROM).

Receiver 210 also includes a control interface unit 224 that connects the broadcast receiver 210 with the conditional access security sub-system 250. As described in section above, control access is a protection of content required by content owners or service providers. Conventional access approaches use dedicated surface mount devices such as Smartcard, SIM card, secure SD card or the like. In conventional approaches, CA instruction code and keys provisioned by CA providers adapted to ensure security are typically stored in a non-volatile memory, such as an EEPROM or Flash, which are relatively expensive and cannot be easily and cost effectively integrated using standard CMOS fabrication processes. A novel conditional access security (CAS) sub-system according to an embodiment of the present invention will be described in detail below.

Referring to FIG. 2, CAS sub-system 250 includes a secure processor 252 coupled to a memory unit 254. The secure CPU may be a RISC CPU configured to process various processing operations. CAS sub-system 250 may further include a crypto hardware 256 that, in an embodiment, includes suitable crypto logic, circuitry (e.g., hardware) for performing cryptographic operations. In a specific embodiment, crypto hardware 256 may be a crypto processor configure to perform cryptographic functions such as processing digital signature, key management, identifying public keys and others due to the secure access requirements. During the manufacturing process, cryptographic hardware may generate a unique crypto ID (device identifier) for the receiver SOC 200 and a unique encryption key. CAS sub-system also includes a fuse bank 260. In an embodiment, fuse bank 260 may include electrically programmable fuses on the chip. In an embodiment, the fuse bank may contain an array of electrically programmable registers, each having a number of bits. The bits can be programmed during the manufacturing process or later by the service provider as the device is shipped to the user. In an embodiment, corresponding bits of the fuse bank are burned or blown according to the value of the unique device ID and a certificate key. In a specific embodiment, memory unit 254 may include random access memory and read-only memory. In contrast to conventional techniques, memory unit 254 does not includes EEPROM and/or Flash memory to facilitate the integration process and to minimize cost by using conventional (i.e., standard) CMOS process.

In an embodiment, receiver SOC 200 includes an external memory interface 268 configured to interface with an external memory device (not shown). The external memory may be a flash memory containing firmware or software code and other associated information data that are required for the receiver SOC to perform the descrambling functions. Details of the firmware, software code and the associated information data will be described in detail in sections below. In an embodiment, the external memory interface 268 can include a SD memory card slot, a multimedia card (MMC), a micro SD card slot, a mini SDHC, a microSDHC, a Memory Stick slot, a PCMCIA interface, a USB interface, a serial or a parallel interface, and others. The external memory can be a commercial off-the-shelf Flash memory in a specific embodiment.

In accordance with embodiments of the present invention, the conditional access (CA) software code is stored in a random access memory (RAM). The CA software is dynamically downloaded from an external non-volatile flash memory via the external memory interface 268 to the RAM during the power cycle of the security sub-system. However, because the external flash storing the CA software is outside the security perimeter it must first be authenticated and checked for any malicious alteration (such as bypass of the security function that could be inserted by a hacker). The secure sub-system implements a protocol to authenticate the firmware using a public key algorithm and digital certificate provisioned during manufacturing.

Figure 3:
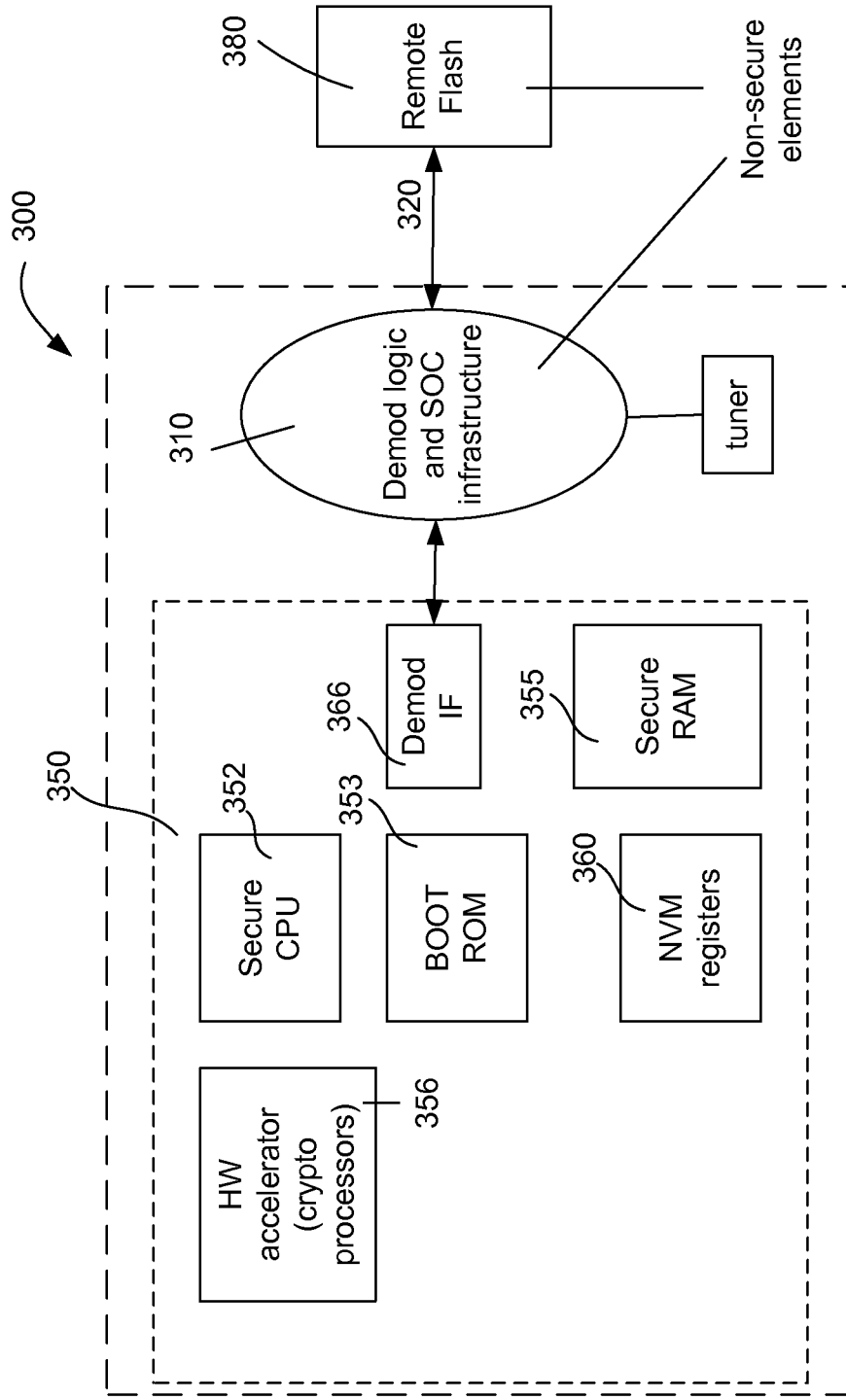
FIG. 3 is a simplified block diagram of a demodulator SOC having an integrated secure element according to an embodiment of the present invention.

FIG. 3 is a block diagram of a demodulator SOC 300 including a demodulation logic 310 coupled to a remote memory device 480 (e.g., Flash memory) and an integrated secure element 350 according to an embodiment of the present invention. Demodulation logic 310 may have a similar configuration of the receiver 210 shown in FIG. 2. For example, demodulation logic 310 may include a demodulator, a descrambler, a control CPU, a memory unit that comprises RAM and/or ROM, a host interface, and a control interface unit; the functions of those elements have been described in details in the sections above and won't be repeated herein for brevity. The demodulator logic 310 may further include system-on-a chip infrastructure such as registers, IO ports, an external memory interface link 320, which may be similar to the external memory interface port 268 shown in FIG. 2 and described above. In an embodiment, remote or external Flash memory 380 may be coupled to the demodulator SOC 300 through the interface link 320. The coupling can be by means of a physical connection such as a SD card connector or a USB connector. In another embodiment, the coupling can be by means of an optical (e.g., infrared) or radio wave (e.g., Bluetooth, wireless LAN IEEE802.11, or the like) communication link.

In an embodiment, integrated secure element 350 includes a secure CPU 352, a boot read-only memory (ROM) 353, a secure random access memory (RAM) 355, multiple non-volatile memory registers (or one-time programmable fuse banks) 360. CPU 352 may include an adder and logic for executing arithmetic operations or comparative decisions. In an embodiment, the non-volatile memory registers are implemented using fuse cells that can be fabricated using standard CMOS processes. In an embodiment, the non-volatile memory registers are programmed (burned or blown) during the silicon manufacturing process to store information such as the device ID, the root public key, and others. Integrated secure element 350 also includes a hardware accelerator 356 that can be one or more crypto processors as described above in association with crypto hardware 256 of FIG. 2.

In order to minimize cost, the CA software code is stored in the secure RAM 355 according to an embodiment of the present invention. CA software is understood as instructions, one or more sets of instructions, data files, firmware, or executable applications that are provided to the secure CPU 352 for execution. CA software is dynamically downloaded from the remote (external) flash memory 380 to the RAM 355 ("RAM-ware") during the power cycle of the integrated secure element 350. Because CA software is downloaded from the external Flash memory, it must be first authenticated by the integrated secure element 350. In an embodiment, the secure element operates a protocol to authenticate the RAM-ware using a public key algorithm and a digital certificate (e.g., a unique device ID) that is provided during the manufacturing of the demodulator SOC. In an embodiment, the authentication process can be assisted and accelerated using hardware accelerator 356.

In an embodiment, CA software is received by the demodulator logic from the external memory and transferred to the secure RAM 355 via a demodulator interface circuit 366. In contrast to conventional secure elements that store the CA software code in EEPROM and/or Flash memory, embodiments of the present invention provides a RAM-ware architecture that can be updated securely and easily, e.g., by downloading firmware (i.e., software, program codes, data files) stored in external memories. Because the external memory containing the CA software is outside the security perimeter of the secure element, it must first be authenticated. In an embodiment, the downloaded CA software is authenticated by the secure element running boot authenticate programs from the boot ROM 353. Because the RAM-ware architecture does not require EEPROM and/or Flash memory that requires among other things a double poly process or a tunnel oxide process and expensive testing equipment and procedures, the RAM-based architecture of the present invention can be cost effectively produced using standard CMOS processes.

In an embodiment, the integrated secure element produces an attribute based on a digital certificate contained in the received software (now RAM-ware because it is now stored in the secure RAM) and provides the attribute to the demodulator logic for descrambling the received data streams (not shown). In some embodiments, the attribute can be a secure bit pattern or a secure codeword to enable the descrambling process in the demodulator logic 310.

In an embodiment, the integrated secure element 350 is activated when the TV application is enabled by the user. When the TV application is enabled, the demodulator logic causes the boot ROM to execute the boot instructions and activate the integrated secure element. During the boot process, the conditional access (CA) firmware stored in the external flash memory is downloaded to the RAM disposed in the secure element, so that the CPU starts operating.

As described above, the remote Flash memory contains conditional access (CA) executable applications or data files that are dynamically loaded to the RAM 355 disposed in the integrated secure element. In an embodiment, the external memory contains a digital certificate that is generated by the CA vendor or the demodulator SOC device manufacturer and signed with the root private key or a derivative of the root key using public key infrastructure (PKI). In an embodiment, the digital certificate may be unique to each demodulator SOC device and contains a device identification (ID) code. In an embodiment, the same identification code may also be stored in one or more of the non-volatile registers 460. In an embodiment, the non-volatile memory registers 360 may also store a digital signature of the CA software or CA firmware. In an embodiment, the boot ROM authenticates the CA firmware by means of the digital certificate.

In an embodiment, the secure boot ROM may process the digital certificate as follows: (i) verify that the certificate is authentic and the certificate has been signed by a trusted delegate of the root key owner; (ii) verify that the certificate is intended for the given device by comparing the device ID stored in the secure element NVM (non-volatile memory) registers and the code stored in the certificate to ensure that they match; and (iii) authenticate the firmware by regenerating its signature with the root public key and comparing the result with the value stored in the certificate. Only when the above three steps are successful, the SW that has been downloaded to the secure element RAM is verified and considered to be trustworthy. In an embodiment, the SW code in the external memory may be encrypted. In this case, it is first deciphered by the boot ROM. The SW encryption key (or a derivative) is stored in the secure element NVM registers and used directly by the ROM code.

Figure 4:
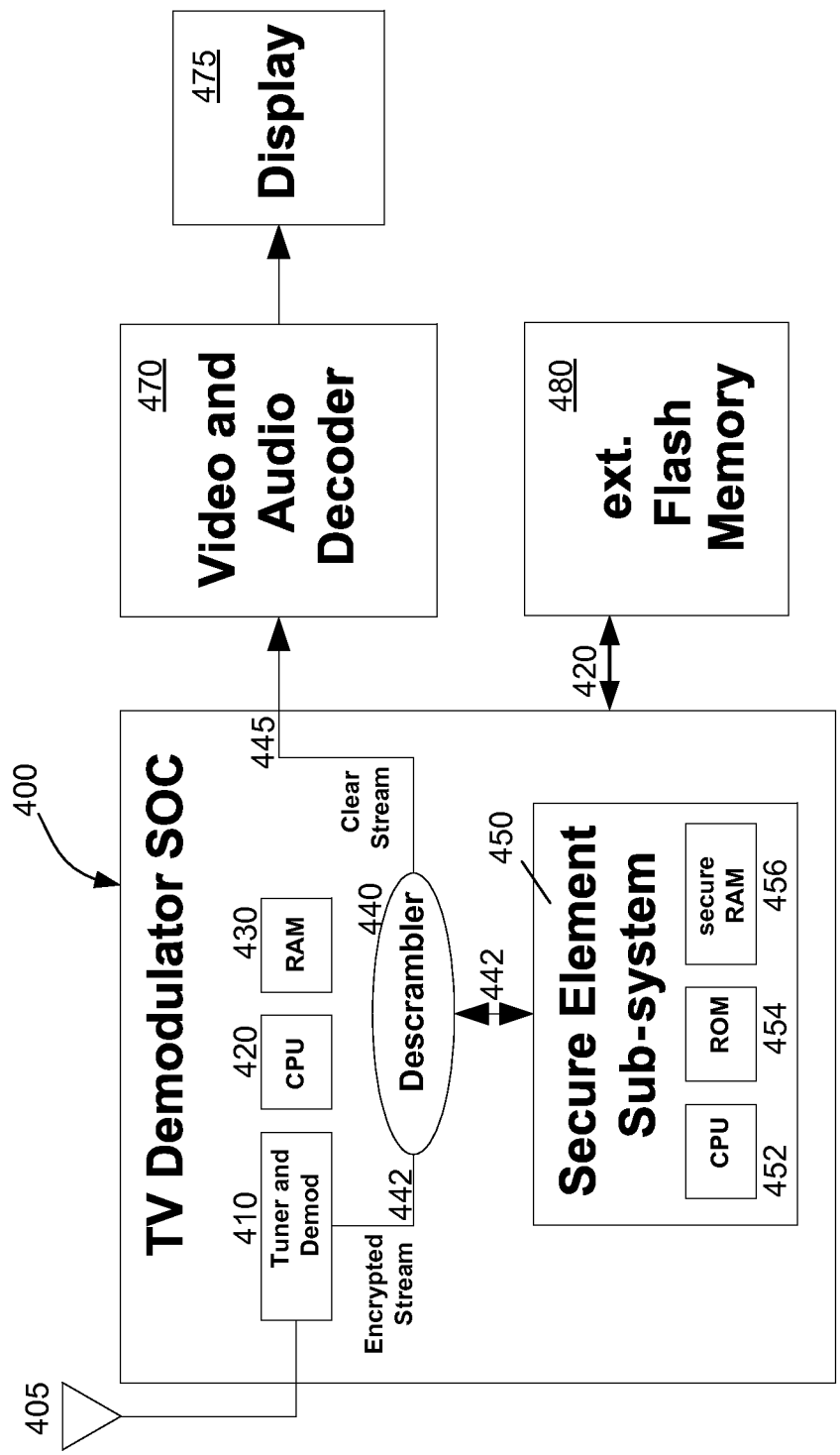
FIG. 4 is a block diagram of a TV demodulator SOC in communication with an external video and audio decoder and an external flash memory according to an embodiment of the present invention.

FIG. 4 is a block diagram of a TV demodulator SOC 400 in communication with an external video and audio decoder 470 and a flash memory 480 according to an embodiment of the present invention. As shown, the TV demodulator SOC includes a tuner and demodulator 410 coupled to an antenna 405 for received a desired modulated content that may be encrypted. TV demodulator SOC 400 may include a demodulator CPU 420 for communicating with a user and for controlling the tuner demodulator. Demodulator CPU 420 is coupled to a memory unit 430 that may contain static random access memory and read-only memory. TV demodulator SOC 400 also includes a descrambler 440 that is configured to received an encrypted data stream 412 from the tuner and demodulator 410 using an encryption key or a control word delivered from a secure element sub-system. In contrast to a conventional conditional access system, the secure element sub-system is integrated within the TV demodulator SOC. The secure element sub-system includes a secure CPU 452 coupled to a read-only memory ROM 456 and a secure random access memory RAM 456. In contrast to the conventional access system that contains flash memory or EEPROM for storing boot loader firmware, TV demodulator SOC does not include flash memory or EEPROM, so that TV demodulator SOC can be fabricated using cost effective standard CMOS processes that do not require special floating gate processes and associated testing steps.

TV demodulator SOC receives a firmware image (i.e., data representative of the firmware disposed in an external device. The term firmware and firmware image will be used alternatively hereinafter) from external flash memory 480 via a memory interface port 420. The firmware download can be, for example, initiated by the demodulator CPU 420 and stored in the secure RAM 456. Because the flash memory is external to the TV demodulator SOC and thus to the secure element sub-system, the firmware image must be first authenticated by the secure element sub-system before being executed. Upon a successful authentication, the secure element sub-system will execute the firmware image to produce a control word or encryption key for the descrambler to decipher the encrypted data stream. The control word is transmitted to the descrambler through a physical link 442 that must be protected from hacking Details of the firmware download from the external flash memory, the authentication process and the protection of the control word through obfuscation will be described in more detail below.

The descrambler deciphers the encrypted data stream and produces a clear data stream to a video and audio decoder 470 that is coupled to a display unit 475 for reproducing the video and audio content.

Figure 5:
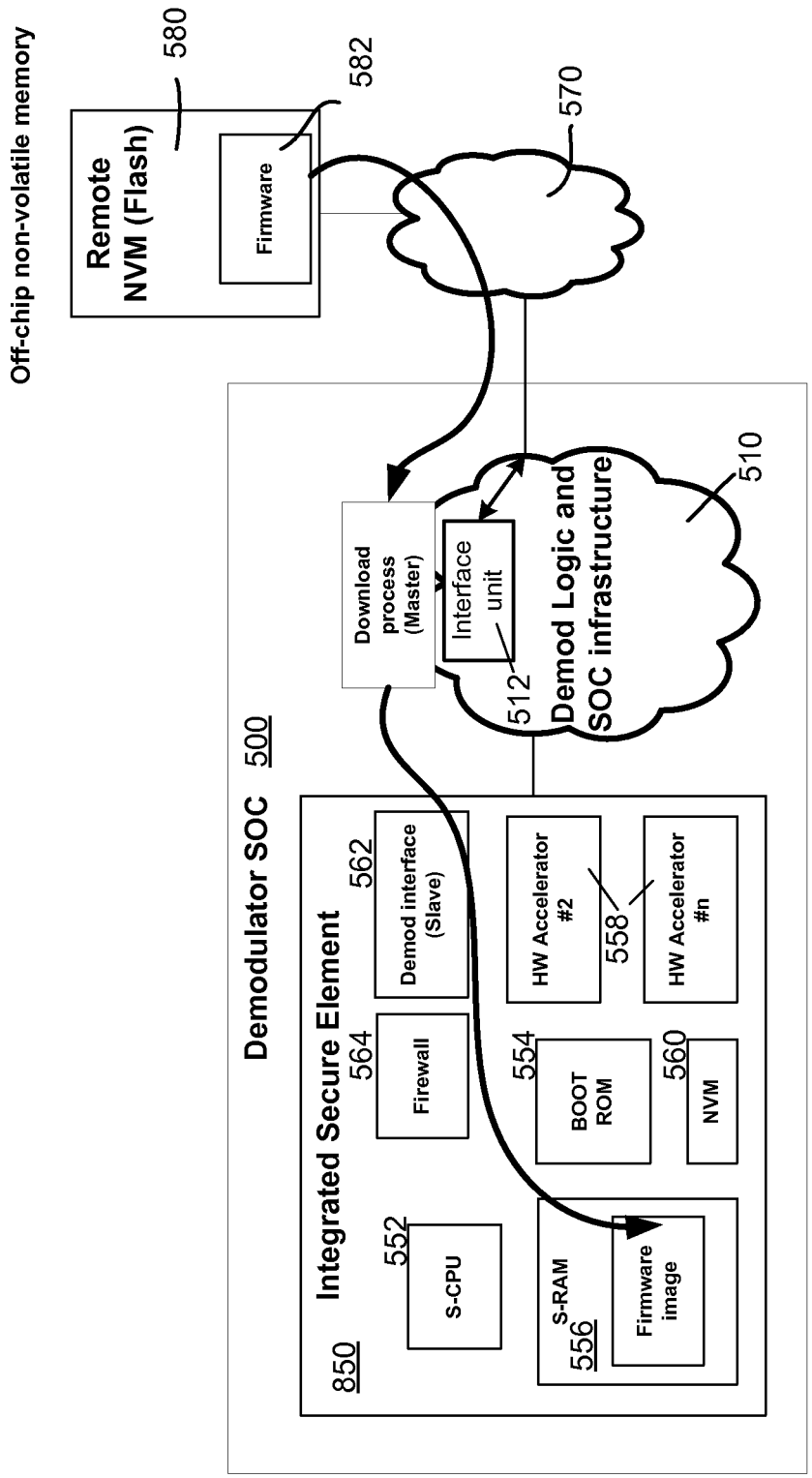
FIG. 5 illustrates a demodulator SOC performing a firmware download operation from an external memory according to an embodiment of the present invention.

FIG. 5 illustrates a demodulator SOC 500 performing a firmware download operation from an external memory according to an embodiment of the present invention. Demodulator SOC 500 comprises a demodulator logic 510 and an integrated secure element 550. Demodulator logic 510 may include a tuner, a demodulator, a descrambler, control CPU, a memory unit, a host interface as shown in FIG. 2. The demodulator logic may include SOC infrastructure having one or more IO ports, a memory interface unit, and others. In an exemplary embodiment, the SOC infrastructure may include an interface unit 512 such as a USB, a peripheral computer interface (PCI), a SD (secure digital) interface, or a communication link for interfacing with an off-chip non-volatile memory 580. In a specific embodiment, interface unit 512 may establish a connection to the remote memory via a short distance physical connection by means of a USB connector, an SD connector, or the like. In another embodiment, the interface unit 512 may coupled to the remote NVM memory 580 via a local area network, a personal area network (Bluetooth) or a wireless area network according to the IEEE802.11 standard or the like (the local, personal, or wireless area network is indicated as a cloud 570).

The integrated secure element includes a secure CPU 552 that together with a boot ROM 554 initiates the integrated secure element at power up. The secure element further includes a secure random access memory (S-RAM) 556, one or more hardware accelerators 558, one or more non-volatile memory (NVM) registers or fuses 560, and a slave demodulator interface circuit 562 that couples the integrated secure element 550 with the demodulator logic 510.

The secure element may include a firewall 564 that allows for the secure CPU to initiate a connection to the remote memory 580 and download firmware (i.e., data files, executable applications) 582 from the remote memory to the secure S-RAM 556, but does not allows the remote memory to initiate a connection in the reverse direction.

After clearing the content of secure S-RAM 556, the demodulator SOC may initiate a download of firmware 582 from remote flash device 580. The download process can be performed by the demodulator CPU D-CPU by means of the hardware master port and send the firmware to the secure S-RAM through slave port interface 562. However, this read-and-write of the CA firmware from the remote flash memory cannot be considered as secure because demodulator logic 510 and remote flash memory 580 are outside of the secure element boundary. Therefore, the downloaded firmware image in the secure S-RAM must be authenticated to protect the firmware image from modification. Once the firmware image download is complete, the secure element locks the slave interface and the firewall to prevent any subsequent access from the non-trusted demodulator interface and secure S-CPU 552 may start executing from boot ROM 554. It is noted that the demodulator logic cannot access secure element 550 through master-slave demodulator interface 562 once the security element is locked.

Figure 6:
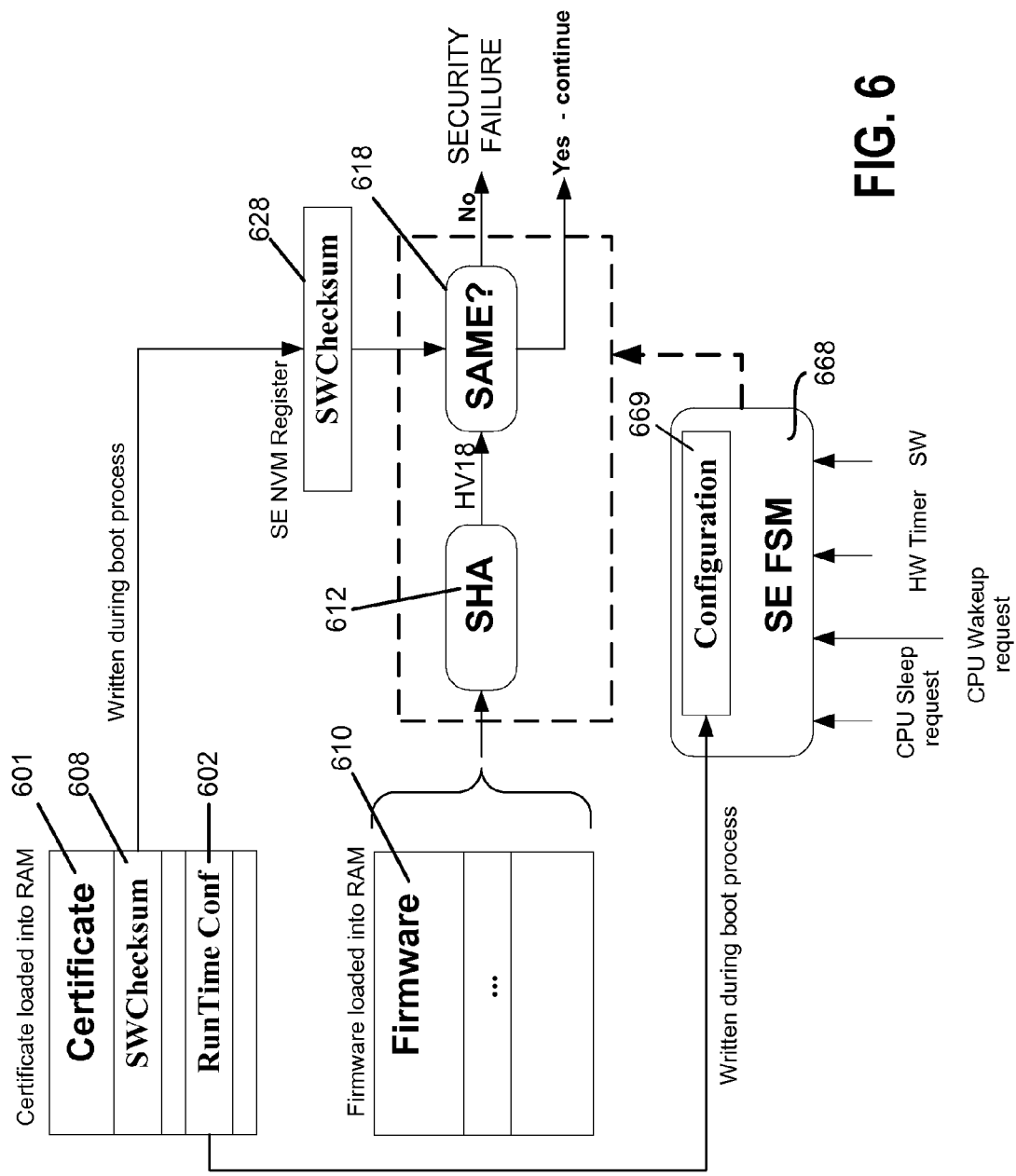
FIG. 6 is a diagram illustrating an exemplary firmware run-time authentication using hardware facilities provided by the secure element according to an embodiment of the present invention.

FIG. 6 is a diagram illustrating a firmware run-time authentication 600 using hardware facilities provided by the secure element according to an exemplary embodiment of the present invention. Firmware run-time authentication 600 is an exemplary embodiment providing an efficient way to mitigate the risk of running malicious code at run time. The firmware run-time authentication verifies and authenticates software within power cycles to protect hardware intrusive attacks and fault injection. In an embodiment, the hardware facilities of the secure element writes (programs by burning or blowing fuses) a software checksum SWChecksum 608 to one or more of the NVM registers 628 during the boot process and writes runtime configuration parameter to corresponding configuration registers of the secure element finite state machine 668, which controls the cryptographic hash function 612 and the comparator 618. Cryptographic hash function 612 produces a hash value HV18 from firmware 610 and compares (618) the hash value HV18 with the SWChecksum stored in one of the NVM registers 628. In the event that there is a match (indicated as "Yes"), the secure element continues its operation. In the event there is no match (indicated as "No"), i.e., the firmware may have been modified or compromised, the secure element disables the firmware execution. In some embodiments, the firmware run-time authentication can be triggered from different sources that may include, but is not limited to: 1) software driven by requesting an authentication through a control register in the security element; 2) hardware timer as a recurring event driven by a hardware counter set during the boot process; 3) when the secure S-CPU enters or exits a sleep period; or 4) when the secure S-CPU receives a wakeup request.

In an embodiment, the hash value of the decrypted firmware is stored in the boot certificate and is programmed into one of the NVM (one-time-programmable) registers in the secure element during the boot process so that it cannot be modified or altered. It is important to note that this process cannot be performed by the RAM-ware itself because the RAM-ware can be tampered with, Thus, the process has to be performed entirely in hardware or using code stored in ROM that cannot be modified. The SWchechsum written into a write-once memory register can be reset on power-on/off of the secure element. In addition, the secure element includes control parameters that define the source and recurrence of the run-time check.

In an embodiment, certificate 601 may include runtime configuration data 602 that is written into associated configuration registers 669 of the secure element. Configuration data 602 may configure or customize the finite state machine (FSM) so that the secure element operates in a manner that is desired by a vendor or a service provider. In this example embodiment, certificate 601, the secure element may start executing the firmware in the secure RAM upon a successful authentication. The execution of the firmware may include generating a control word and provide it securely to the demodulator for deciphering encrypted data streams.

Figure 7:
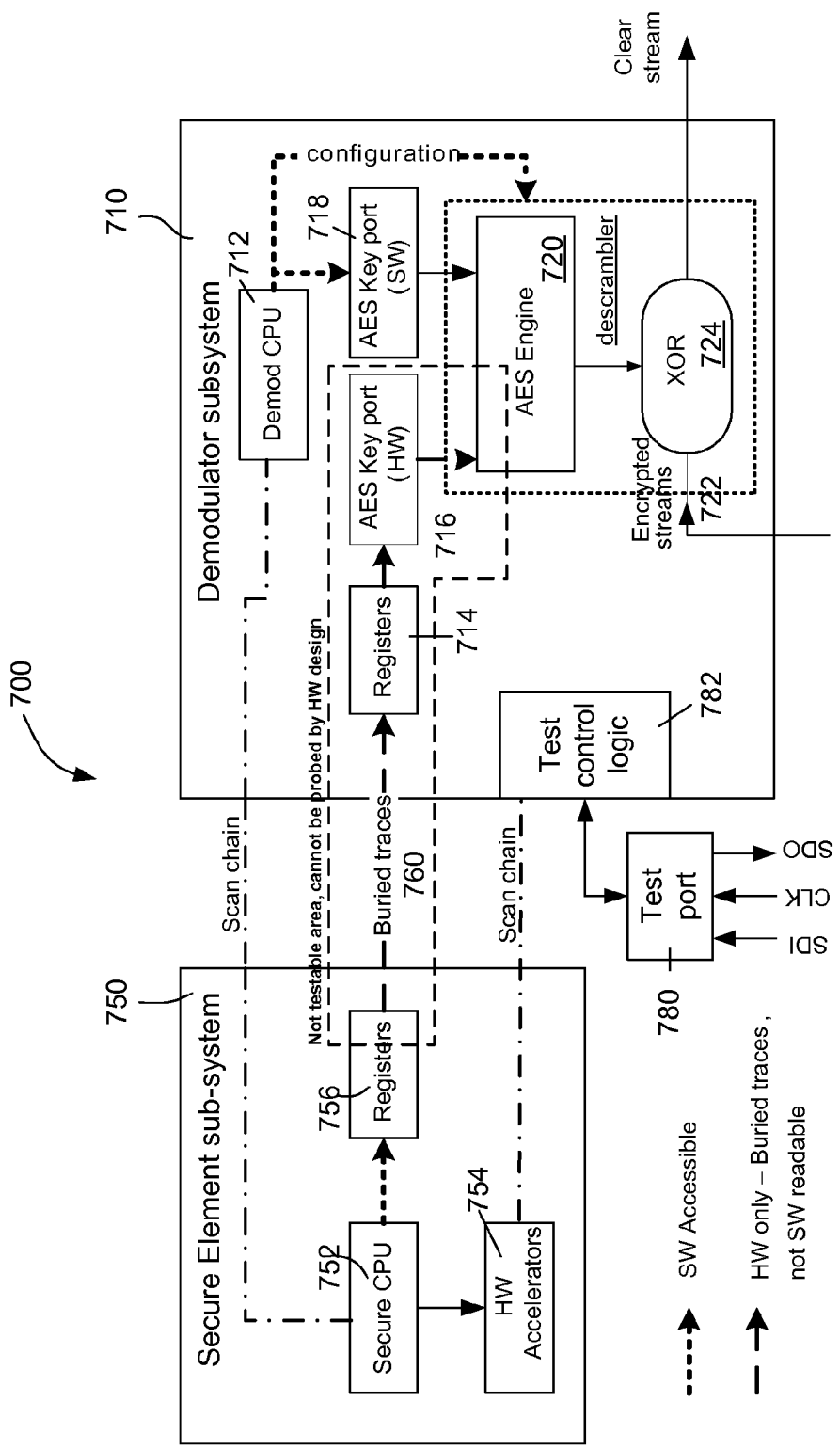
FIG. 7 a block diagram illustrating a control word obfuscating scheme according to an embodiment of the present invention.

FIG. 7 is an exemplary block diagram illustrating a receiver 700 having a control word obfuscating scheme according to an embodiment of the present invention. Receiver 700, as shown, includes a demodulator subsystem 710 and a secure element sub-system 750. Demodulator sub-system 710 also includes an input terminal (not shown) for receiving encrypted data streams. The encrypted data streams are provided to a descrambler that may include an exclusive logic circuit XOR 724 that receives an encryption key from an encryption engine 720. Encryption engine 720 is coupled to a first encryption key port 716 and a second encryption key port 718. In an embodiment, first encryption key port 716 may receive one or more control words from one or more registers 714 and provides the one or more control words to the encryption engine 720. Encryption engine 720 may also receive one or more encryption keys from second encryption key port 718. Encryption engine 720 may also receive configuration data from a demodulator CPU 712.

Secure element sub-system 750 includes, in part, a secure CPU 752 and one or more hardware accelerators 754 that may include crypto processors to assist the secure CPU to perform encryption operations and others. Hardware accelerators have been described in detail in sections above and won't be repeated herein. Secure element sub-system 750 may include logic and circuits as shown in secure elements 250 and 350 of respective FIGS. 2 and 3 and performs, among others, authentication of the firmware image stored in the secure RAM and generates one or more control words for the descrambler of demodulator sub-system 710. Secure element sub-system 750 also includes one or more secure registers 756 for storing the one or more control words before sending them to the descrambler.

By design, the secure element sub-system is considered to be secure. However, the descrambler that is located in the demodulator sub-system is not protected and is vulnerable to legitimate or unauthorized access. As shown, a user can have access to the descrambler by issuing read and write commands through the demodulator CPU. In an embodiment, the receiver may include a test access port 780 having a test control logic 782 for supporting a design-for-test operating mode. Test access port 780 may includes test input pin(s) SDI, test output pin(s) SDO and a test clock pin CLK. Test control logic 782 may set the receiver in a built-in self testing mode, a test scan mode, or other testing modes where logic states of function blocks in the receiver can be probed. When the receiver is set in such a test mode, code words stored in the registers 714 or 756 may be compromised. It is appreciated that, although a pair of register 714 and 756 is shown, some embodiments may use only either registers 714 or registers 756.

In order to protect the control word(s), embodiments of the present invention provide hardware design methods and devices to obfuscate the control word. As shown in FIG. 7, registers 714, 756 and associated signal traces connecting the registers are placed in an area that cannot be probed either by hardware or software. In an embodiment, registers 714, 756 may be manually instantiated during the design cycle or at the end of the design cycle to be excluded from the design-for-test compilation, so that registers 714 and 756 will not or cannot be scanned or probed when the receiver is set in a test mode. In another embodiment, registers 756 and 714 may be manually placed and the interconnect signal traces are manually routed within at least one signal trace layer that is buried and thus not accessible from test probes, e.g., the at least one signal trace layer may be buried under the many metal layers of the design. In yet another embodiment, the circuit design of the receiver including a netlist of component placement and signal routing may be safeguarded as a secure document in a protected medium (e.g., magnetic medium such as magnetic tape, hard disk, optical medium such as ROM), that can only be accessed to a very limited and selected design team. In yet another embodiment, the content of the secure registers 714, 756 is cleared when the receiver is set in a test mode.

While the advantages and embodiments of the present invention have been depicted and described, there are many more possible embodiments, applications and advantages without deviating from the spirit of the inventive ideas described herein. It will be apparent to those skilled in the art that many modifications and variations in construction and widely differing embodiments and applications of the present invention will suggest themselves without departing from the spirit and scope of the invention. For example, the obfuscation of control words can be a combination of the above disclosed design methods where other obfuscation steps may be added to further deter any attempt of reverse-engineering by a hacker. For example, access to the secure registers may be cut off using laser beam after testing of the protected area, or fuses are designed into signal traces connected the secure registers with the test control logic and the fuses are blown after the final testing of the receiver.

It is understood that the above embodiments of the present invention are illustrative and not limitative. Various alternatives and equivalents are possible. The invention is not limited by the type of integrated circuits in which the present disclosure may be disposed. Other additions, subtractions or modifications are obvious in view of the present invention and are intended to fall within the scope of the appended claims.

What is claimed is:

1. An integrated circuit comprising:
a demodulator; and
a secure element coupled to the demodulator, the secure element comprising:
a non-volatile storage configured to store a unique identifier;
a read-only memory comprising a boot code;
a random access memory; and
a processor coupled to the read-only memory and the random access memory and operative to:
receive firmware from a device external to the integrated circuit;
store the firmware in the random access memory;
authenticate the firmware by executing the boot code and using the unique identifier;
generate a control word if the firmware is authenticated; and
securely send the control word to the demodulator.

2. The integrated circuit of claim 1 further comprising a first secure register configured to store the control word prior to sending the control word to the demodulator.

3. The integrated circuit of claim 2, wherein the first secure register is not accessible to a user.

4. The integrated circuit of claim 2, wherein the first secure register is coupled with the demodulator via a secure link having one or more buried signal traces.

5. The integrated circuit of claim 4, wherein the one or more buried signal traces are placed in at least one buried signal layer.

6. The integrated circuit of claim 2 further comprising a second secure register coupled to the first register via the secure link.

7. The integrated circuit of claim 2, wherein the secure element clears the secure register when the integrated circuit enters a test mode.

8. The integrated circuit of claim 1, wherein the processor is further operative to:
lock the secure element after storing the firmware in the random access memory, thereby preventing the demodulator from accessing the secure element.

9. The integrated circuit of claim 1, wherein the demodulator further comprises a descrambler configured to decipher an encrypted data stream using the control word.

10. A method of demodulating data in an integrated circuit comprising:
storing a unique identifier in a non-volatile storage disposed in the integrated circuit;

storing a boot code in a read-only memory disposed in the integrated circuit;
receiving firmware from a storage device external to the integrated circuit;
storing the firmware in a random access memory disposed in the integrated circuit;
attempting to authenticate the firmware by executing the boot code and using the unique identifier;
generating a control word if the firmware is authenticated; and
demodulating the data using the control word.

11. The method of claim 10 further comprising storing the control word in a protected register prior to demodulating the data.

12. The method of claim 11 further comprising clearing the content of the protected register during a test mode.

13. The method of claim 11 further comprising providing a secure link between the protected register and a demodulator demodulating the data.

14. The method of claim 13, wherein the secure link comprises at least one buried signal trace.

15. The method of claim 10, wherein the authenticating of the firmware stored in the random access memory comprises:
comparing a value associated with a portion of the firmware with the unique identifier.

* * * * *